Figure 1:
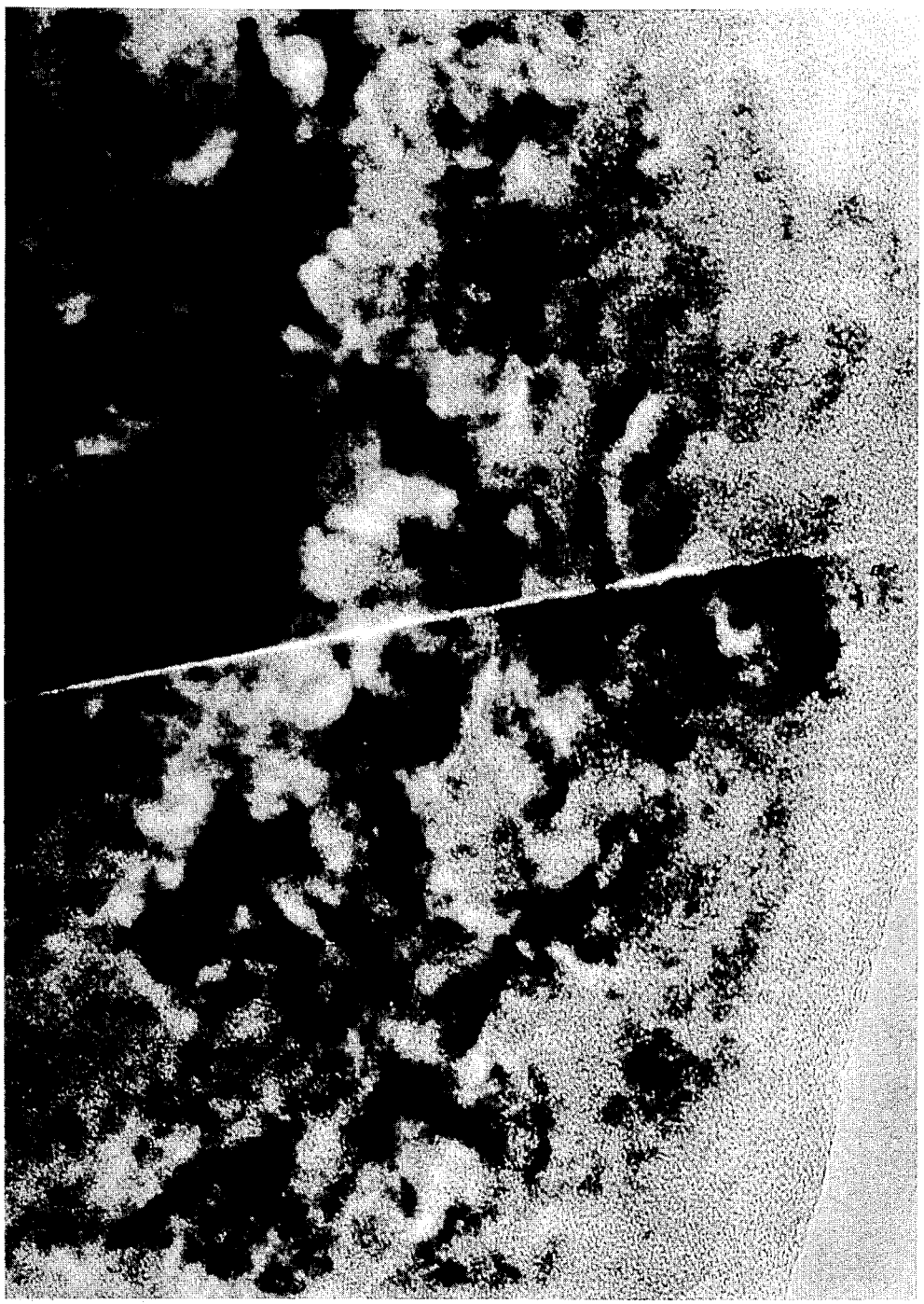

United States Patent [19]

Lay et al.

[11] Patent Number: 4,869,866

[45] Date of Patent: * Sep. 26, 1989

[54] NUCLEAR FUEL

[75] Inventors: Kenneth W. Lay, Schenectady, N.Y.; Herman S. Rosenbaum, Fremont, Calif.; John H. Davies, San Jose, Calif.; Mickey O. Marlowe, Fremont, Calif.

[73] Assignee: General Electric Company, Schenectady, N.Y.

[*] Notice: The portion of the term of this patent subsequent to Sep. 26, 2006 has been disclaimed.

[21] Appl. No.: 123,616

[22] Filed: Nov. 20, 1987

[51] Int. Cl.⁴ ................................................ G21C 3/00
[52] U.S. Cl. .................................. 376/421; 252/636; 252/638; 264/0.5; 423/255; 423/261
[58] Field of Search ................. 376/421, 422, 901; 264/0.5; 252/636, 638; 423/255, 261

[56] References Cited

U.S. PATENT DOCUMENTS

| | | | |
|---|---|---|---|
| 3,263,004 | 7/1966 | Bean | 264/0.5 |
| 3,501,411 | 3/1970 | Triggiani et al. | 252/301.1 |
| 3,679,596 | 7/1972 | Hill et al. | 252/301.1 R |
| 3,715,273 | 2/1973 | Rigby et al. | 376/421 |
| 3,826,754 | 7/1974 | Grossman | 252/301.1 R |
| 3,867,489 | 2/1975 | Rubin | 264/0.5 |
| 3,872,022 | 3/1975 | Hollander et al. | 252/301.1 R |
| 3,883,623 | 5/1975 | Lay | 264/0.5 |
| 3,923,933 | 12/1975 | Lay | 264/0.5 |
| 3,927,154 | 12/1975 | Carter | 264/0.5 |
| 4,052,330 | 10/1977 | Jensen et al. | 252/301.1 R |
| 4,094,738 | 6/1978 | Chubb | 376/421 |
| 4,264,540 | 4/1981 | Butler | 264/0.5 |
| 4,401,608 | 8/1983 | Smith | 264/0.5 |

FOREIGN PATENT DOCUMENTS 55-27942 2/1980 Japan.

Primary Examiner—Donald P. Walsh
Attorney, Agent, or Firm—Jane M. Binkowski; James C. Davis, Jr.; Paul R. Webb, II

[57] ABSTRACT

A mixture of uranium dioxide and additive of aluminosilicate composition is formed into a compact and sintered to produce a nuclear fuel wherein the uranium dioxide grains have an average grain size of at least about 20 microns and wherein substantially all of the grains are each enveloped by glassy aluminosilicate phase.

32 Claims, 2 Drawing Sheets

NUCLEAR FUEL

This invention relates to the production of a nuclear fuel body with improved mechanical properties. In one aspect, it is directed to firing a compact of particular composition comprised of uranium dioxide and an aluminosilicate to produce a nuclear fuel of particular microstructure.

Nuclear reactors are presently being designed, constructed and operated in which the fissionable material or nuclear fuel is contained in fuel elements which may have various geometric shapes, such as plates, tubes or rods. Nuclear fuel is enclosed usually in a corrosion-resistant, non-reactive, heat conductive container or clad which as assembled with the nuclear fuel is called a fuel element. The fuel elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reactor. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium), certain magnesium alloys and others. The failure of the clad, due to the buildup of gas pressure or high temperatures in the fuel, or due to corrosion of the clad by deleterious fission products, can contaminate the coolant or moderator and the associated steam systems with intensely radioactive longlived products to a degree which interferes with plant operation.

The present theoretical and experimental information indicates that a larger grain size in uranium dioxide nuclear fuel will reduce fission gas release rates, a desired attribute which would result in either reduced void space in the fuel rod or an increased design burn-up life for the fuel. Unfortunately, as grain size is increased, the high temperature creep rate of the fuel is reduced - an undesirable result since this gives a greater strain on the clad during a reactor power ramp. Such fuel-induced cladding strain can lead to cladding failure via a mechanism known as PCI (Pellet Clad Interaction). A fuel with both a larger grain size and an increased creep rate is therefore of interest. Such a fuel is provided by the present invention.

The present nuclear fuel has a microstructure which is useful in avoiding cladding failure. Specifically, the present fuel is a sintered body of uranium dioxide grains having an average size of at least about 20 microns wherein the grains are surrounded by a glassy aluminosilicate phase. At an elevated temperature, generally at about 1000° C. and higher, the glassy phase increases the creep rate or plasticity of the sintered body significantly above that of uranium dioxide.

Figure 2:
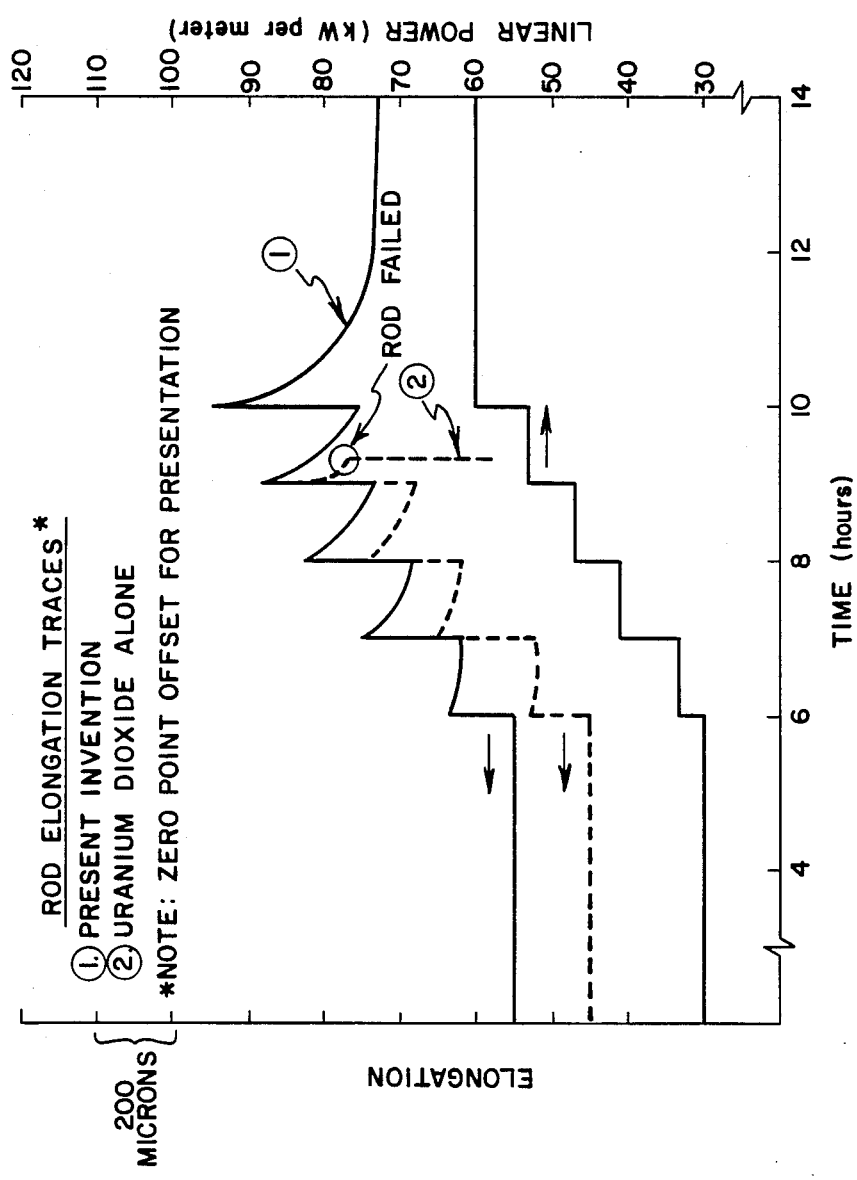

Those skilled in the art will gain a further and better understanding of the present invention from the detailed description set forth below, considered in conjunction with the figures accompanying and forming a part of the specification in which:

FIG. 1 is a transmission electron micrograph of a polished cross-section (magnified 1.584 million x) of the present sintered body showing the glassy aluminosilicate phase as a substantially straight light-colored line; and FIG. 2 shows graphs which illustrate elongation of the present nuclear fuel (graph No. 1) and a prior art nuclear fuel (graph No. 2) in a nuclear fuel reactor in response to a step-wise ramp up of power shown by the third (bottom) graph. In FIG. 2, graph Nos. 1 and 2 were offset, i.e. separated, from each other on the elongation scale by 200 microns for clarity of presentation, and the present nuclear fuel was produced with 0.25 weight % tile clay whereas the prior art fuel was comprised of uranium dioxide alone.

Briefly stated, the present process for producing a sintered uranium dioxide body wherein the uranium dioxide grains have an average size of at least about 20 microns and wherein at least about 99% by volume of said grains are each coated with glassy aluminosilicate phase leaving no significant portion thereof exposed comprises providing a sinterable uranium dioxide powder containing a fissionable substance, providing a material with a sintering agent composition comprised of from about 1 weight % to about 60 weight % of $Al_2O_3$ balance $SiO_2$, admixing said material with said uranium dioxide powder to give said sintering agent composition ranging from about 0.1% by weight to 1% by weight of a mixture comprised of sintering agent composition and uranium dioxide, forming the resulting mixture into a compact, sintering said compact at a temperature at which said sintering agent is liquid ranging from greater than about 1500° C. to a temperature at which there is no significant vaporization of $SiO_2$ to produce a sintered product having said average grain size and cooling said product producing said sintered body.

By "glassy" or "glassy aluminosilicate" it is meant herein an amorphous aluminosilicate.

In carrying out the present process, a sinterable uranium dioxide powder is provided containing a fissionable material or substance in an amount effective for making the resulting sintered body useful as nuclear fuel. Representative of such fissionable material is uranium such as U-235 and plutonium such as Pu-239. Normally, uranium dioxide powder contains a fissionable isotope of uranium, and frequently it is enriched with such isotope. These powders are known in the art and generally contain a fissionable isotope of uranium in an amount ranging from about 0.1% by weight to about 5% by weight of the total amount of uranium dioxide powder. The uranium dioxide powder has a total oxygen to a total uranium atomic ratio (O/U ratio) ranging from about 1.7 to about 2.25, frequently from greater than about 2.00 to about 2.15, depending largely on processing conditions.

Generally, the uranium dioxide powder used in the present process has a specific surface area ranging from about 2 to 12 square meters per gram, preferably from about 4 to 8 square meters per gram. Such powders allow sintering to be carried out within a reasonable length of time at the present sintering temperature. Uranium dioxide powder having a smaller surface area usually is not useful because it would require sintering temperatures too high to be practical and extraordinary measures to prevent evaporation of $SiO_2$. On the other hand, uranium dioxide powders having a larger surface area are difficult to handle because of their high chemical reactivity.

The sintering agent is comprised of from about 10 weight % to about 60 weight % $Al_2O_3$ balance $SiO_2$. In one embodiment, the present sintering agent contains from about 10 weight % to about 20 weight % $Al_2O_3$, and in another embodiment, it contains from greater than about 20 weight % to about 60 weight % $Al_2O_3$. Frequently, the present sintering agent ranges from about 40 weight % to about 55 weight % $Al_2O_3$ balance $SiO_2$.

The present sintering agent can be in a number of forms. For example, it can be a combination of $Al_2O_3$ and $SiO_2$ powders and/or an aluminosilicate. The aluminosilicate can be a natural material, or it can be produced by a number of techniques such as by melting or solid state sintering of a blend of $Al_2O_3$ and $SiO_2$ powders. The natural material can be a clay or mineral preferably predominantly comprised of the present sintering agent. Representative of such natural materials is bentonite and tile clay. Specifically, the natural material should be a material which, when fired, but before reaching sintering temperature, has a fired composition comprised of the present aluminosilicate and impurities in an amount of less than about 10% by weight of the fired composition. The impurities remaining in the fired composition should have no significant deleterious effect on the present nuclear fuel.

The sintering agent is used in an amount ranging from about 0.1% by weight to about 1% by weight of the mixture comprised of uranium dioxide powder and sintering agent. The particular amount of sintering agent used is determinable empirically and depends largely on the particular sintered body desired. Frequently, the present sintering agent ranges from about 0.1% by weight to about 0.8% by weight, or from about 0.2% by weight to about 0.6% by weight, or from about 0.25% by weight to about 0.5% by weight, of the total weight of the mixture comprised of uranium dioxide and sintering agent. In one embodiment, the sintering agent ranges from about 0.1% by weight to less than about 0.5% by weight, or from about 0.1% by weight or 0.2% by weight to about 0.4% by weight, of the mixture comprised of uranium dioxide powder and sintering agent.

The sintering agent and/or source thereof can be admixed with the uranium dioxide powder by a number of conventional techniques, and preferably, they are admixed to form a mixture wherein the sintering agent is dispersed therein preferably at least significantly or substantially uniformly. The sintering agent and/or source thereof is particulate in form and need only be of a size which will form the desired mixture, and generally, they are less than about 20 microns.

If desired, a pore-forming additive may also be admixed with the powder to aid in producing the desired porosity in the sintered body. Conventional pore-forming additives can be used such as, for example, ammonium oxalate, polymethyl methacrylate or other materials which volatilize away on heating below sintering temperature. The pore-forming additive can be used in a conventional manner in an effective amount. Generally, the amount of pore-forming additive ranges from about 0.1% by weight to about 2% by weight of the mixture comprised of uranium dioxide, sintering agent and pore-forming additive.

A number of conventional techniques can be used to shape or press the mixture into a compact. For example, it can be extruded, injection molded, die pressed or isostatically pressed to produce the compact of desired shape. Any lubricants, binders or similar materials used to aid shaping of the mixture should have no significant deleterious effect on the compact or the resulting sintered body. Such shaping-aid materials are preferably of the type which evaporate on heating at relatively low temperatures, preferably below 500° C., leaving no significant residue. Preferably, the compact has a porosity of less than about 60% and more preferably less than about 50% to promote densification during sintering.

The compact can have any desired configuration such as, for example, a pellet, cylinder, plate or square. Typically, the compact is in the form of a cylinder, usually a right cylinder.

The compact is sintered under conditions which will produce the present sintered body. The compact is sintered in an atmosphere which can vary depending largely on the particular manufacturing process. Preferably, the atmosphere is at or about ambient or at or about atmospheric pressure. The compact can be sintered in an atmosphere which is known to be useful for sintering uranium dioxide alone in the production of uranium dioxide nuclear fuel. However, sintering in a vacuum would not be useful since it would tend to vaporize the $SiO_2$. Generally, the compact is sintered in an atmosphere selected from the group consisting of hydrogen, wet hydrogen preferably having a dewpoint of about 20° C., a controlled atmosphere of a mixture of gases which in equilibrium produces a partial pressure of oxygen sufficient to maintain the uranium dioxide at a desired oxygen to uranium atomic ratio and a combination thereof. Representative of a suitable mixture of gases which in equilibrium produces a partial pressure of oxygen is carbon dioxide and carbon monoxide as disclosed in U.S. Pat. No. 3,927,154 to Carter assigned to the assignee hereof and incorporated herein by reference.

The compact is sintered at a temperature at which the sintering agent forms a liquid phase with the uranium dioxide which enables production of the present liquid phase-sintered body. Generally, the higher the $SiO_2$ content of the sintering agent the lower is the temperature at which the liquid phase forms. The present sintering temperature ranges from above about 1500° C. to a temperature at which there is no significant vaporization of $SiO_2$. Generally, it ranges from above about 1500° C. to about 2000° C., preferably from about 1540° C. to about 1750° C., and more preferably from about 1600° C. to about 1700° C.

When the sintering agent contains from about 10 weight % to about 20 weight % $Al_2O_3$, at the sintering temperature only solid uranium dioxide and a liquid phase are present. On cooling, the liquid phase produces only a glassy aluminosilicate phase. Generally, this glassy phase has a composition which is the same as, or which does not differ significantly from, that of the sintering agent, and it is present in an amount which is the same as, or which does not differ significantly from, the amount of sintering agent used.

However, when the sintering agent contains more than about 20 weight % $Al_2O_3$, it produces in the sintered body a glassy phase comprised of about 20 weight % $Al_2O_3$ and about 80 weight % $SiO_2$ and crystalline mullite phase in the form of rods. Generally, in this embodiment of the invention, the total amount of glassy and mullite phases produced is the same as, or does not differ significantly from, the amount of sintering agent used. Specifically, the total amount of glassy aluminosilicate and mullite phase generally ranges from about 0.1% by weight to about 1% by weight of the sintered body with the glassy phase component being present in an amount of at least about 0.05% by weight of the sintered body, and the mullite phase component being present in at least a detectable amount, i.e. an amount detectable by transmission electron microscopy and selected area electron diffraction. Ordinarily, as the $Al_2O_3$ content of the sintering agent is increased, the amount of mullite present in the sintered body increases.

When the sintering agent contains more than about 20 weight % $Al_2O_3$, it may or may not be totally liquid at sintering temperature. When it is totally liquid, cooling of the liquid phase precipitates out some mullite and produces a sintered body wherein the mullite is present in the glassy phase in pockets between the coated uranium dioxide grains. However, at lower sintering temperatures and/or higher $Al_2O_3$ contents, the sintering agent may produce a liquid phase and also some mullite at sintering temperature which results in a sintered body wherein small grains of mullite are present in the glassy phase in pockets between the coated uranium dioxide grains and wherein large grains of mullite protrude into the coated uranium dioxide grains. The mullite rods which protrude into the uranium dioxide grains are significantly longer, ordinarily at least about 20% longer, than the mullite rods located in the glassy phase. Also, the mullite rods which protrude into the uranium dioxide grains generally are present in an amount of less than about 50% by volume of the total amount of mullite phase present in the sintered body.

The compact is maintained at sintering temperature for a time required to produce the present sintered body. Time at sintering temperature is determinable empirically depending largely on the particular sintered body desired. Generally, the grain size of uranium dioxide in the sintered body is determined by sintering temperature, time at sintering temperature and by the sintering agent. Ordinarily, the higher the sintering temperature and/or the longer the time at sintering temperature, the larger are the uranium dioxide grains. Higher alumina contents in the sintering agent also result in larger uranium dioxide grains.

The rate of heating to sintering temperature is limited largely by how fast any by-product gases are removed prior to sintering and generally this depends on the gas flow rate through the furnace and its uniformity therein as well as the amount of material in the furnace. Generally, a rate of heating of from about 50° C. per hour to about 300° C. per hour is used until by-product gases have been removed from the furnace, and this may be determined empirically by standard techniques. The rate of heating can then be increased, if desired, to a range of about 300° C. to 500° C. per hour and as high as 800° C. per hour but should not be so rapid as to crack the bodies.

Upon completion of sintering, the sintered product is cooled to produce the present sintered body, and usually it is cooled to ambient or to about room temperature, which generally ranges from about 20° C. to about 30° C. The rate of cooling of the sintered product or body is not critical, but it should not be so rapid as to crack the body. Specifically, the rate of cooling can be the same as the cooling rates normally or usually used in commercial sintering furnaces. These cooling rates may range from about 100° C. to about 800° C. per hour. The sintered product or body can be cooled in the same atmosphere in which it was sintered or a different atmosphere which has no significant deleterious effect thereon.

In one embodiment, the present sintered body is comprised of crystalline uranium dioxide grains and an amorphous glassy aluminosilicate phase comprised of from about 10 weight % to about 20 weight % $Al_2O_3$ balance $SiO_2$. In this embodiment, the glassy phase ranges from about 0.1% by weight to about 1% by weight of the sintered body. Frequently, it ranges from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body.

In another embodiment, the present sintered body is comprised of crystalline uranium dioxide, glassy aluminosilicate phase comprised of about 20 weight % $Al_2O_3$ balance $SiO_2$ and mullite phase with the mullite phase being present in at least a detectable amount, and the glassy phase being present in an amount of at least about 0.05% by weight of the body. Generally, in this embodiment, the total amount of glassy and mullite phases is the same as, or does not differ significantly from, the amount of sintering agent used. Specifically, the total amount of glassy and mullite phases ranges from about 0.1% by weight to about 1% by weight, or from about 0.1% by weight to about 0.8% by weight, or from about 0.2% by weight to about 0.6% by weight, or from about 0.25% by weight to about 0.5% by weight, or from about 0.1% by weight to less than about 0.5% by weight, or from about 0.1% by weight or 0.2% by weight to about 0.4% by weight, of the sintered body. Frequently, the glassy phase component is present in an amount greater than about 0.05% by weight, or greater than about 0.1% by weight, or greater than about 0.2% by weight of the sintered body. Also, frequently, the mullite phase component is present in an amount of at least about 0.01% by weight, or at least about 0.1% by weight, or at least about 0.2% by weight, of the sintered body.

The present sintering agent in an amount of less than about 0.1% by weight may not produce the present sintered body. On the other hand, the sintering agent in an amount greater than about 1% by weight produces an excessive amount of glassy and/or mullite phases which provide no significant advantage, and which would occupy space that could usefully by occupied by uranium dioxide.

Generally, the glassy phase in the sintered body is free of uranium dioxide. However, it is possible that in some instances some uranium dioxide might be present in the glassy phase in a minor amount detectable by exotic analysis not believed to be presently available, and in such instances, the uranium dioxide ordinarily would range up to about 0.5% by weight of the glassy phase.

The glassy aluminosilicate phase in the sintered body is a continuous interconnecting phase. The glassy phase coats each uranium dioxide grain leaving no significant portion thereof exposed of at least about 99% by volume, preferably more than 99.5% by volume, of the total volume of uranium dioxide grains in the sintered body. Most preferably, it coats every uranium dioxide grain leaving no significant portion thereof exposed. By a glassy phase which coats a uranium dioxide grain leaving no significant portion thereof exposed it is meant a coating which covers at least substantially all of the grain. Specifically, the glassy phase forms a thin continuous adherent coating on each uranium dioxide grain it coats which generally ranges from about 5 to about 20 Angstroms in thickness. In a preferred embodiment, the glassy phase coats each uranium dioxide grain totally, i.e. it totally envelops, each uranium dioxide grain of at least about 99% by volume, preferably more than 99.5% by volume, of the total volume of uranium dioxide grains in the sintered body. More preferably, the glassy phase coats every uranium dioxide grain totally. The glassy aluminosilicate phase also extends to some degree into the interstices, i.e. 3-grain and 4-grain interstices, between the coated uranium dioxide grains. The extent to which the glassy phase fills the interstices depends largely on the amount of sintering agent in the sintered body. The morphology of the microstructure of the sintered body indicates that the glassy aluminosilicate phase was a liquid at sintering temperature.

The uranium dioxide grains in the sintered body have an average grain size, i.e. average diameter, ranging from about 20 microns to about 100 microns, preferably from about 30 microns to about 80 microns, frequently from about 40 microns to about 70 microns, and more frequently from about 45 microns to about 60 microns. In one embodiment of the present invention, the uranium dioxide grains do not differ significantly in size.

The average grain size can be determined in a standard manner. In the present invention a standard line intercept technique was used. Specifically, a line was drawn on a photomicrograph of a polished and etched crosssection of the sintered body, and the grain boundaries intercepting along a specific length of line were counted and divided into that specific length of line to give an average grain intercept length in terms of microns. That value was then multiplied by 1.5 to determine the average grain size.

The present sintered body has the appearance of having been liquid phase sintered. The uranium dioxide grain corners as viewed in a polished section often appear rounded with glassy phase pockets located at the grain corner, i.e. they have the appearance of a liquid phase sintered ceramic. Generally, the uranium dioxide grains are equiaxed or substantially equiaxed.

The present sintered body generally is free of crystalline phases of $Al_2O_3$ and $SiO_2$ The present sintered body always contains some porosity which generally is a closed porosity, i.e. noninterconnecting pores. The porosity is distributed through the sintered body, and preferably, it is distributed at least significantly or substantially uniformly. Generally, the porosity of the sintered body ranges from about 2% by volume to less than about 10% by volume of the sintered body depending largely on reactor design. Frequently, the porosity ranges from about 4% by volume to about 8% by volume, more frequently from about 4% by volume to about 6% by volume, and most frequently about 5% by volume, of the total volume of the sintered body. Preferably, the pores range in size from greater than about 1 micron to about 20 microns, and more preferably from about 5 microns to about 20 microns.

Ordinarily, the dimensions of the present sintered body differ from those of the unsintered body by the extent of shrinkage, i.e. densification, which occurs during sintering.

An aluminosilicate outside the present range is not operable as a sintering agent to produce the present sintered body. Generally, an aluminosilicate containing more than about 90 weight % $SiO_2$ produces a sintered body with too small a grain size. On the other hand, an aluminosilicate containing $Al_2O_3$ in an amount ranging from more than about 60 weight % up to the composition of mullite, i.e. a crystalline aluminosilicate containing at least about 71.5% wt. % $Al_2O_3$, is not useful because the amount of the desired glassy phase is too small with most of the sintering agent present as crystalline mullite.

Mullite is not useful as a sintering agent because it would produce mullite crystalline phase in the sintered body and would not produce the present required glassy aluminosilicate phase.

$SiO_2$ alone is not useful as a sintering agent because it produces a sintered body with too small a grain size, and the glassy phase formed does not distribute itself uniformly throughout the sintered body. Likewise, $Al_2O_3$ alone would leave crystalline $Al_2O_3$ in the sintered body. Crystalline phases do not impart plasticity at elevated temperature to a sintered uranium dioxide body which is significantly higher than that of uranium dioxide alone.

The present sintered body is useful as a nuclear fuel. It contains fissionable material generally in the same amount present in the uranium dioxide powder. The large grain size of the present sintered body should significantly lower fission gas release rates. Also, the glassy phase coating the uranium dioxide grains imparts to the sintered body a plasticity or creep rate which should allow the fuel to perform without putting significant sustained stress on the cladding.

The invention is further illustrated by the following examples wherein the procedure was as follows, unless otherwise stated:

Submicron sinterable uranium dioxide powder containing a fissionable isotope of uranium and having an oxygen to uranium atomic ratio greater than about 2.0 was used.

The sintering agent was particulate in form.

A typical analysis of the bentonite mineral before ignition: 72.45 wt. % silica, 1.21 wt. % ferric oxide, 15.47 wt. % aluminum oxide, 1.97 wt. % calcium oxide, 1.69 wt. % magnesium oxide, 6.76 wt. % loss on ignition, 0.23 wt. % sodium oxide, 0.06 wt. % potassium oxide, 0.032 wt. % sulfur and 0.33 wt. % titanium oxide.

A typical analysis of the tile clay mineral before ignition: 46.04 wt. % silica, 0.81 wt. % ferric oxide, 38.80 wt. % aluminum oxide, 0.52 wt. % calcium oxide, 0.43 wt. % magnesium oxide, 13.0 wt. % loss on ignition, 0.09 wt. % sodium oxide, 0.12 wt. % potassium oxide, 0.041 wt. % sulfur and 1.33 wt. % titanium dioxide.

The sintering agent was admixed with the uranium dioxide powder in a standard manner by stirring to produce a substantially uniform mixture.

The mixture of uranium dioxide powder and sintering agent was die pressed in a steel die to give a green body in pellet form, i.e. a compact in the form of a roughly equiaxed cylinder with a porosity of about 50%.

The sintering atmosphere was hydrogen.

The sintering atmosphere was at or about atmospheric pressure.

Density was determined in a standard manner by weighing the sintered body and measuring its dimensions.

Porosity of the sintered body was determined by knowing or estimating the theoretical density of the sintered body on the basis of its composition and comparing that to the density measured using the following equation:

$$\text{porosity} = \left(1 - \frac{\text{measured density}}{\text{theoretical density}}\right)100\%$$

Average uranium dioxide grain size of the sintered body was determined by the line intercept method disclosed herein.

The sintered body was characterized by a number of standard techniques.

Based on other work, it was known that the sintered body had an oxygen to uranium atomic ratio of about 2.00.

Creep rate of the sintered body was determined by compressing a right circular cylindrical specimen along its axis at elevated temperatures with a fixed load in a 94% Ar and 6% $H_2$ atmosphere. The steady state creep rate is disclosed in Table I.

EXAMPLE 1

The aluminosilicate component of the tile clay mineral was comprised of about 45 weight % $Al_2O_3$ and about 55 weight % $SiO_2$. The tile clay mineral was calcined in air at 750° C. to a constant weight. 99.75 weight % of uranium dioxide powder and 0.25 weight % of the calcined tile clay powder (about 0.24 weight % of aluminosilicate component based on mixture comprised of aluminosilicate and uranium dioxide) were blended along with (based on the mixture of uranium dioxide and tile clay powders) 2 weight % temporary binder and 0.8 weight % pore former in a vibratory mill using alumina milling media. The mixture was pressed into pellets with a green density of 5.35 gm/cm$^3$ (about 52% porosity) and sintered in an atmosphere of wet cracked ammonia (25% $N_2$ and 75% $H_2$ with a dew point of about 10° C.) at about 1650° C. for about 4 hours. The binder and pore former decomposed and vaporized away below 1000° C.

Examination of the microstructure of some of the resulting sintered bodies showed a substantially uniform distribution of the glassy phase at the uranium dioxide grain boundaries. The average uranium dioxide grain size was about 27-33 microns. The sintered bodies had a porosity of about 5% by volume which was comprised of closed pores distributed therein. These sintered bodies would be useful as a nuclear fuel.

Based on chemical analysis done on similar sintered bodies, it was known that the glassy phase was an aluminosilicate phase which did not differ significantly in composition, or in amount, from the aluminosilicate component of the sintering agent. Also, based on other work, it was known that the glassy phase was continuous, interconnecting and coated each uranium dioxide grain of more than 99% by volume of the uranium dioxide grains leaving no significant portion thereof exposed.

The sintered bodies were loaded into a cladding tube of zirconium alloy (Zircaloy-2) to form a first fuel rod assembly.

For comparison, a standard fuel of uranium dioxide alone was prepared. The uranium dioxide powder was pressed into pellets with a green density of 5.10-5.18 gm/cm$^3$ (about 55% porosity) and sintered in an atmosphere of wet cracked ammonia (25% $N_2$ and 75% $H_2$ with a dew point of about 10° C.) at about 1780° C. for about 4 hours. The resulting sintered bodies had an average grain size of about 15-17 microns. The sintered bodies of uranium dioxide alone were loaded into a cladding tube of zirconium alloy (Zircaloy-2) to form a second fuel rod assembly substantially similar to the first fuel rod assembly.

Each fuel rod assembly was irradiated in a nuclear reactor under substantially the same low power conditions and then instrumented to determine elongation characteristics as a function of power during subsequent irradiation.

The results are shown in FIG. 2. The fuel rod elongation for the present fuel containing 0.25% tile clay and for standard fuel of uranium dioxide alone are shown as a function of time. The fuel power generation rate in kilowatts per meter is also shown. It can be seen that when the fuel power level was increased, the fuel rods elongated and then relaxed with time. FIG. 2 shows that at the higher power levels, the present fuel length showed significant relaxation following each power increase. This is an indication of the high deformation rate of the present fuel and the rapid relaxation of stresses on the cladding.

Significantly, the fuel rod comprised of standard fuel failed by the pellet-cladding interaction fuel failure mechanism at 52 kW/m, because the cladding could not withstand the sustained high stresses induced by the fuel. The point of failure is indicated in FIG. 2 by a characteristic rapid contraction of the fuel rod.

It is inferred from the results described above that the rapid relaxation of cladding stresses, attributed to the high deformation rate of the present fuel, confers a degree of pellet-cladding interaction resistance on fuel rod designs which employ the present fuel.

EXAMPLE 2

As-received tile clay mineral was used as the sintering agent. Its aluminosilicate component was comprised of about 46 weight % $Al_2O_3$ and about 54 weight % $SiO_2$.

0.5% by weight of the tile clay mineral was admixed with the uranium dioxide powder to produce a mixture containing the sintering agent in an amount of about 0.435% by weight of the mixture comprised of sintering agent and uranium dioxide.

The mixture was pressed into a compact. Several compacts of about the same size were produced. The compacts were sintered simultaneously in hydrogen at a temperature of about 1650° C. where they were maintained for about 4 hours and then furnace-cooled to room temperature.

The sintered body had an average grain size of about 23 microns and a porosity of about 3% by volume which was comprised of closed pores distributed in the body.

The creep rates of two of the sintered bodies were determined and the results are given in Table I as examples 2A and B. Specifically, Example 2A shows that at 1500° C. and 2000 psi stress, the sintered body had a creep rate of $2.60 \times 10^{-3} hr^{-1}$. This value is about 30 times greater than the creep rate of a sintered body of uranium dioxide alone with an average grain size of about 15 microns under the same temperature and stress conditions as reported in the literature. Also, Example 2B shows that at 1500° C. and 4000 psi stress, the sintered body had a creep rate of $5.7 \times 10^{-3} hr^{-1}$. This value is about 30 times greater than the creep rate of a sintered body of uranium dioxide alone with an average grain size of about 15 microns under the same temperature and stress conditions as reported in the literature.

Based on a series of other experiments, it was known that the sintered body was comprised of crystalline uranium dioxide grains, glassy phase and crystalline mullite, and that the glassy phase was an aluminosilicate comprised of about 20 weight % Al$_2$O$_3$ and about 80 weight % SiO$_2$. Also, based on other work, it was known that the total amount of glassy and mullite phases in the sintered body did not differ significantly from the amount of aluminosilicate component of the sintering agent and that the glassy and mullite phases were present in substantially equivalent amounts. Also, based on other work, it was known that the glassy phase was continuous, interconnecting and coated each uranium dioxide grain of more than 99% by volume of the uranium dioxide grains with no significant portion thereof exposed. Also, based on other work, it was known that the mullite was in the form of rods located at the uranium dioxide grain interstices.

EXAMPLE 3

The sintering agent was comprised of 45% weight % Al$_2$O$_3$ powder and 55 weight % SiO$_2$ powder.

The sintering agent was admixed with the uranium dioxide powder to produce a substantially uniform mixture containing the sintering agent in an amount of 0.5% by weight of the total mixture.

The mixture was pressed into a compact. The compact was sintered at about 1640° C. for 7 hours and then furnace-cooled to about room temperature.

A polished cross-section of the sintered body was examined under light microscopy. It was comprised of uranium dioxide grains, glassy phase and mullite. The mullite was in the form of rods located in the pockets of glassy phase between the uranium dioxide grains. Based on other work, it was known that the glassy phase was an aluminosilicate comprised of about 20 weight % Al$_2$O$_3$ and about 80 weight % SiO$_2$, that the total amount of glassy and mullite phases in the sintered body did not differ significantly from the amount of sintering agent used, and that the glassy and mullite phases were present in substantially equivalent amounts. Also, based on other work, it was known that the glassy phase was continuous, interconnecting and coated each uranium dioxide grain of more than 99% by volume of the uranium dioxide grains leaving no significant portion thereof exposed.

The uranium dioxide grains did not differ significantly in size and had an average size of about 37 microns.

Examples 4–6 were carried out in substantially the same manner as Example 3 except as shown in Table I.

Example 7 was carried out in substantially the same manner as Example 6 except as shown in Table I and noted herein. In Example 7, 0.125% by weight of calcined tile clay mineral (about 0.12% by weight of aluminosilicate component based on mixture comprised of aluminosilicate and uranium dioxide) was used. A cross-section of the sintered body of Example 7 was mechanically thinned, ion-milled, and examined by transmission electron microscopy. A transmission electron micrograph showing the thin intergranular glass phase is shown in FIG. 1. Also, mullite phase in the form of rods was observed in the glassy phase in pockets between the uranium dioxide grains.

Example 8 was carried out in substantially the same manner as Example 2 except as noted herein and as shown in Table I. The aluminosilicate component of the bentonite mineral was comprised of about 18 weight % Al$_2$O$_3$ and about 82 weight % SiO$_2$. In Example 8, the as-received bentonite mineral was melted, solidified and ground to produce a powder of −325 mesh size (U.S. standard screen). 0.125% by weight of the resulting bentonite powder was used (about 0.118% by weight of the aluminosilicate component based on mixture comprised of aluminosilicate and uranium dioxide). A cross-section of the sintered body of Example 8 was mechanically thinned, ion-milled, and examined by transmission electron microscopy. Transmission electron microscopy showed a thin intergranular glassy phase like that found in Example 7 and shown in FIG. 1.

Examples 2–8 are illustrated in Table I.

In Table I, average grain size is that of the uranium dioxide grains of the sintered body. Also, the phase composition of the sintered body is given as phases present besides uranium dioxide. In addition, the creep rate of, for example, 2.50 E-5 indicates $2.50 \times 10^{-5} hr^{-1}$. In Table I, N.D. means not determined.

TABLE I

| Ex. No. | Sintering Agent Al$_2$O$_3$ wt. % | Sintering Agent SiO$_2$ wt. % | Sintering Agent Form | Additive Amount, % by weight | Sintering Time hr. | Sintering Temp. °C. | Characterization Avg. Grain Size | Characterization Phases Present Besides Uranium Dioxide | Steady State Creep Rate Temp. (°C.) | Steady State Creep Rate Stress psi | Steady State Creep Rate Creep Rate hr-1 |
|---|---|---|---|---|---|---|---|---|---|---|---|
| 2A | ~46 | ~54 | tile clay mineral | 0.5 | 4 | 1650 | 23 | N.D. | 1500 | 2000 | 2.60 E-3 |
| 2B | " | " | " | " | " | " | " | " | 1500 | 4000 | 5.70 E-3 |
| 3 | 45 | 55 | Al$_2$O$_3$ + SiO$_2$ | 0.5 | 7 | 1640 | 37 | glass + mullite | N.D. | N.D. | N.D. |
| 4 | " | " | " | 0.25 | 20 | 1640 | 54 | " | N.D. | N.D. | N.D. |
| 5 | " | " | " | 0.5 | 20 | 1640 | 57 | " | N.D. | N.D. | N.D. |
| 6 | " | " | " | 0.08 | 7 | 1640 | 33 | N.D. | N.D. | N.D. | N.D. |
| 7 | ~46 | ~54 | tile clay mineral | 0.125 | 2 | 1650 | N.D. | glass + mullite | N.D. | N.D. | N.D. |
| 8 | ~18 | ~82 | bentonite mineral | 0.125 | 2 | 1650 | N.D. | glass | N.D. | N.D. | N.D. |

The sintered bodies produced in Examples 2–8 are useful as nuclear fuel. Specifically, the creep rate of Example 2 of Table I was substantially higher than that reported in the literature for similar sintered bodies of uranium dioxide alone of smaller average grain size. This high deformation rate of the present nuclear fuel will allow the fuel to perform without putting significant stress on the cladding.

Also the larger grain size of the present fuel should result in significantly lower fission gas release rates.

What is claimed is:

1. A process for producing a sintered uranium dioxide body useful as nuclear fuel wherein the uranium dioxide grains have an average grain size ranging from about 30 microns to about 80 microns and wherein at least about 99% by volume of the uranium dioxide grains are each coated with glassy aluminosilicate phase leaving no significant portion thereof exposed, said body having a porosity ranging from about 2% by volume to less than about 10% by volume, which consists essentially of providing uranium dioxide powder containing a fissionable substance, providing a sintering agent consisting essentially of from about 10 weight % to about 60 weight % $Al_2O_3$ balance $SiO_2$, admixing said sintering agent with said uranium dioxide powder to produce a mixture wherein said sintering agent ranges from about 0.1% by weight to about 0.8% by weight of said mixture, forming the resulting mixture into a compact, sintering said compact at a temperature at which said sintering agent forms a liquid phase ranging from greater than about 1500° C. to a temperature at which there is no significant vaporization of said $SiO_2$ under conditions wherein the oxygen to uranium atomic ratio ranges from about 1.7 to about 2.25 to produce a sintered product having said average grain size and cooling said product to produce said sintered body.

2. The process according to claim 1 wherein said oxygen to uranium atomic ratio ranges from about 2.00 to about 2.15.

3. The process according to claim 1 wherein said porosity of said sintered body ranges from about 4% by volume to about 8% by volume of said sintered body.

4. The process according to claim 1 wherein said sintering agent ranges from about 0.2% by weight to about 0.4% by weight of said mixture 5. The process according to claim 1 wherein said sintering agent ranges from about 0.1% by weight to about 0.2% by weight of said mixture.

6. The process according to claim 1 wherein said sintering agent ranges from bout 0.2% by weight to about 0.6% by weight of said mixture.

7. The process according to claim 1 wherein said sintering agent ranges from about 0.1% by weight to less than about 0.5% by weight of said mixture.

8. The process according to claim 1 wherein said sintering agent consists essentially of from about 10 weight % to about 20 weight % $Al_2O_3$ balance $SiO_2$.

9. The process according to claim 1 wherein said sintering agent consists essentially of from greater than about 20 weight % to about 60 weight % $Al_2O_3$ balance $SiO_2$.

10. The process according to claim 1 wherein said sintering agent consists essentially of from greater than about 20 weight % to about 60 weight % $Al_2O_3$ balance $SiO_2$ and forms a minor amount of mullite phase at sintering temperature.

11. The process according to claim 1 wherein said sintering temperature ranges from about 1540° C. to 1800° C.

12. The process according to claim 1 wherein more than 99.5% by volume of the uranium dioxide grains are each totally enveloped by said glassy phase.

13. The process according to claim 1 wherein said sintering is carried out in a gaseous atmosphere of wet hydrogen.

14. The process according to claim 1 wherein said sintering is carried out in a gaseous atmosphere comprised of a mixture of carbon dioxide and carbon monoxide.

15. The process according to claim 1 wherein said average grain size of uranium dioxide ranges from about 30 microns to about 70 microns.

16. A nuclear fuel body consisting essentially of crystalline uranium dioxide grains and an amorphous glassy phase of aluminosilicate, said uranium dioxide grains having an average size ranging from about 30 microns to about 80 microns, said glassy phase being continuous and interconnecting, each of at least about 99% by volume of said uranium dioxide grains being coated with said glassy phase leaving no significant portion thereof exposed, said glassy phase ranging from about 0.1% by weight to about 0.8% by weight of said body, said glassy phase consisting essentially of from about 10 weight % to about 20 weight % $Al_2O_3$ balance $SiO_2$, said body having a porosity ranging from about 2% by volume to less than about 10% by volume of said body.

17. The body according to claim 16 wherein said oxygen to uranium atomic ratio ranges from about 2.00 to about 2.15.

18. The body according to claim 16 wherein said porosity ranges from about 4% by volume to about 8% by volume of said body.

19. The body according to claim 16 wherein said average size of said uranium dioxide grains ranges from about 40 microns to about 70 microns.

20. The body according to claim 16 wherein said glassy aluminosilicate phase ranges from about 0.1% by weight to less than about 0.5% by weight of said body.

21. A nuclear fuel body consisting essentially of crystalline uranium dioxide grains, an amorphous glassy phase consisting essentially of about 20 weight % $Al_2O_3$ balance $SiO_2$ and crystalline mullite phase in the form of rods, said uranium dioxide grains having an average size ranging from about 30 microns to about 80 microns, said glassy phase being continuous and interconnecting, each of at least about 99% by volume of said uranium dioxide grains being coated by said glassy phase leaving no significant portion thereof exposed, the total amount of said glassy and mullite phases ranging from about 0.1% by weight to about 0.8% by weight of said body, said glassy phase being present in an amount of at least about 0.05% by weight of said body, said mullite phase being present in at least a detectable amount, said body having a porosity ranging from about 2% by volume to less than about 10% by volume of said body.

22. The nuclear fuel body according to claim 21 wherein said mullite phase is present in said glassy phase in pockets between said coated uranium dioxide grains.

23. The nuclear fuel body according to claim 21 wherein said mullite phase is present in said glassy phase in pockets between said coated uranium dioxide grains and also protrudes into said coated uranium dioxide grains.

24. The nuclear fuel body according to claim 21 wherein said oxygen to uranium atomic ratio ranges from about 2.00 to about 2.15.

25. The nuclear fuel body according to claim 21 wherein said porosity ranges from about 4% by volume to about 8% by volume of said body.

26. The nuclear fuel body according to claim 21 wherein said average size of said uranium dioxide grains ranges from about 40 microns to about 70 microns.

27. The nuclear fuel body according to claim 21 wherein said glassy aluminosilicate phase is present in an amount greater than about 0.05% by weight of said body, and said mullite phase is present in an amount of at least about 0.01% by weight of said body.

28. The process according to claim 1 wherein said uranium dioxide grains have an average size ranging from about 40 microns to about 70 microns.

29. The process according to claim 1 wherein said uranium dioxide grains have an average size ranging from about 45 microns to about 60 microns.

30. The process according to claim 1 wherein a natural material is used to provide said sintering agent, said material when fired but below said sintering temperature having a fired composition consisting essentially of said sintering agent and impurities in an amount of less than about 10% by weight of the fired composition.

31. The nuclear fuel body according to claim 16 wherein said uranium dioxide grains have an average size ranging from about 45 microns to about 60 microns.

32. The nuclear fuel body according to claim 21 wherein said uranium dioxide grains have an average size ranging from about 45 microns to about 60 microns.

* * * * *